US008396059B1

(12) United States Patent
Kreeger et al.

(10) Patent No.: US 8,396,059 B1
(45) Date of Patent: Mar. 12, 2013

(54) AUTOMATED DISCOVERY/REDISCOVERY OF SERVER TO NETWORK CONNECTIVITY

(75) Inventors: Lawrence Rolfe Kreeger, Fremont, CA (US); Elango Ganesan, Palo Alto, CA (US); Siva M. Vaddepuri, San Jose, CA (US); Brian Yoshiaki Uchino, Foster City, CA (US); Arvind Prabhudev, Santa Clara, CA (US); Joe Joseph Karimundackal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 610 days.

(21) Appl. No.: 12/167,993

(22) Filed: Jul. 3, 2008

(51) Int. Cl.
*H04Q 11/00* (2006.01)
(52) U.S. Cl. ...................................................... 370/386
(58) Field of Classification Search .................. 370/250, 370/254, 389, 395.5
See application file for complete search history.

(56) References Cited

U.S. PATENT DOCUMENTS

| | | | | |
|---|---|---|---|---|
| 6,516,345 | B1* | 2/2003 | Kracht | 709/220 |
| 6,614,785 | B1* | 9/2003 | Huai et al. | 370/352 |
| 6,788,682 | B1* | 9/2004 | Kimmitt | 370/389 |
| 7,383,330 | B2* | 6/2008 | Moran et al. | 709/223 |
| 7,512,134 | B2* | 3/2009 | Schiller et al. | 370/395.31 |
| 2002/0181395 | A1* | 12/2002 | Foster et al. | 370/229 |
| 2003/0117962 | A1* | 6/2003 | Mattson et al. | 370/250 |
| 2003/0145078 | A1* | 7/2003 | Hubbard | 709/224 |
| 2004/0160953 | A1* | 8/2004 | Banks et al. | 370/386 |
| 2006/0159032 | A1* | 7/2006 | Ukrainetz et al. | 370/254 |
| 2007/0239989 | A1* | 10/2007 | Barnett et al. | 713/185 |
| 2008/0250492 | A1* | 10/2008 | Hazard | 726/15 |
| 2009/0082047 | A1* | 3/2009 | Phillips et al. | 455/517 |

OTHER PUBLICATIONS

"EMC Unveils ControlCenter 6.0," GRID Today, May 21, 2007, http://www.gridtoday.com/grid/1570413.html printed Jul. 3, 2008 (2 pgs.).
Veritas OpForce http://www.symantec.qassociates.co.uk/server-provisioning-veritas-opforce.htm article printed Jul. 3, 2008 (4 pgs.).
Virtual Data Center Management Software, Server Automation & Consolidation Software, http://www.scalent.com/html/learnmore/index.htm article printed Jul. 3, 2008 (2 pgs.).

* cited by examiner

*Primary Examiner* — Dang Ton
*Assistant Examiner* — Ryan Kavleski
(74) *Attorney, Agent, or Firm* — Weaver Austin Villeneuve & Sampson LLP

(57) ABSTRACT

In one embodiment, an apparatus obtains a switch port identifier mapping for each of the plurality of ports of a network device, wherein the switch port identifier mapping indicates a port identifier of one of the plurality of ports of the network device and a switch port identifier of a switch port to which the one of the plurality of ports is connected. The apparatus obtains a set of switch information for each of a plurality of switches, the set of switch information including a set of switch port identifiers associated with the corresponding one of the plurality of switches. The apparatus ascertains for each one of the plurality of ports, a corresponding one of the plurality of switches and a port of the one of the plurality of switches to which the one of the plurality of ports is connected.

24 Claims, 6 Drawing Sheets

AUTOMATED DISCOVERY/REDISCOVERY OF SERVER TO NETWORK CONNECTIVITY

BACKGROUND

1. Technical Field

The present disclosure relates generally to methods and apparatus for discovering connections between ports of a network device and ports of one or more switches.

2. Description of the Related Art

Within networks, network devices such as servers are typically connected to switches within those networks. Often, ports of a single network device are connected to multiple switches. In order to track these connections, cable connections between these ports are typically manually traced. As a result, tracking these multiple cables connecting servers to these multiple switches is difficult and error prone. Likewise, if a cable connection is moved, it can be difficult to detect and even more difficult to find the new connectivity.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order to simplify the description.

Overview

In one embodiment, an apparatus obtains a switch port identifier mapping for each of the plurality of ports of a network device, wherein the switch port identifier mapping indicates a port identifier of one of the plurality of ports of the network device and a switch port identifier of a switch port to which the one of the plurality of ports is connected. The apparatus obtains a set of switch information for each of a plurality of switches, the set of switch information including a set of switch port identifiers associated with the corresponding one of the plurality of switches. The apparatus ascertains for each one of the plurality of ports, a corresponding one of the plurality of switches and a port of the one of the plurality of switches to which the one of the plurality of ports is connected.

Specific Example Embodiments

In accordance with various embodiments, an apparatus such as a Discovery Server may automatically discover connections between ports of a network device and ports of one or more switches. Although the Discovery Server may discover such connections for a plurality of network devices, the examples described herein refer to a single network device in order to simplify the description.

Figure 1:
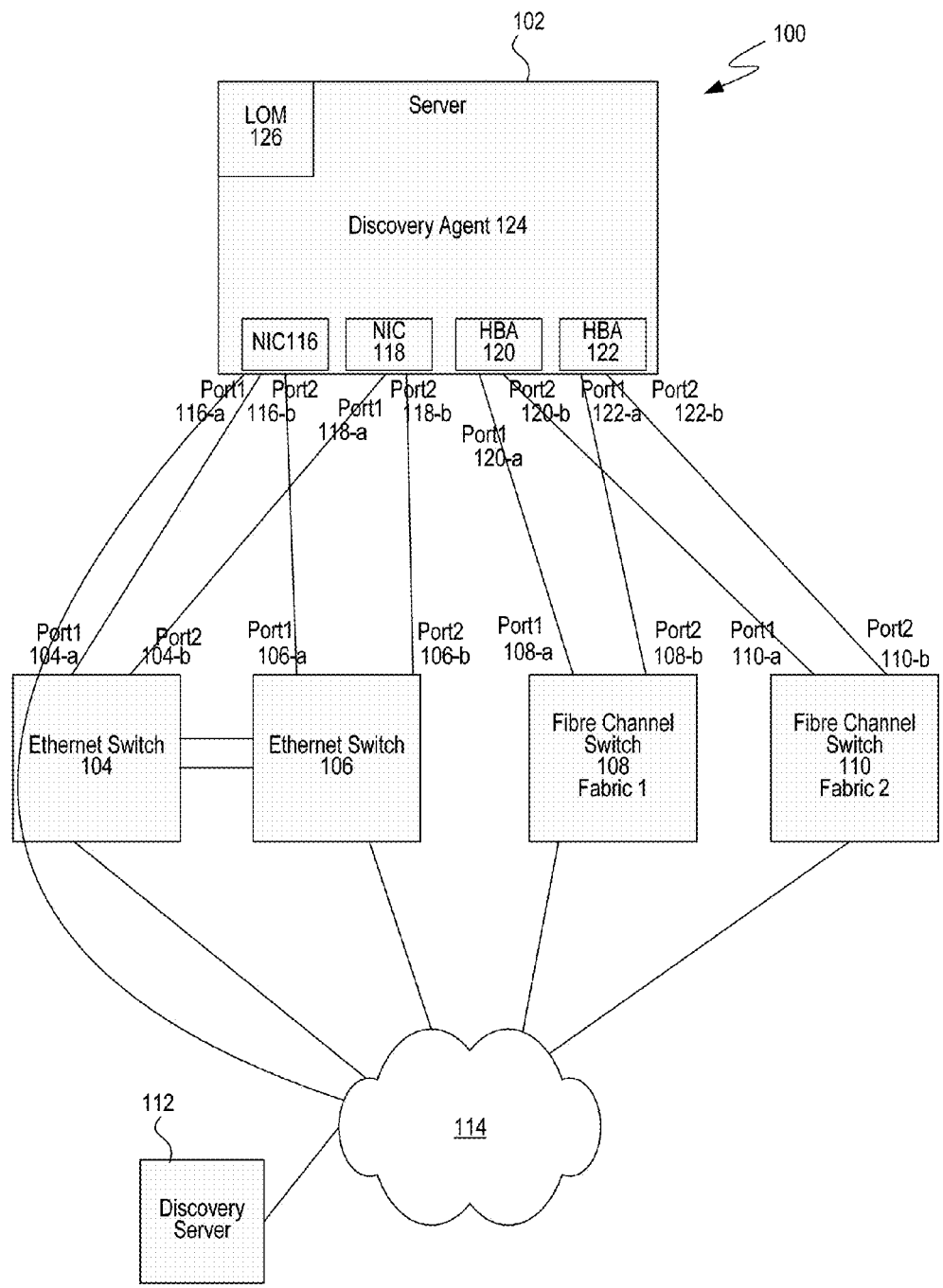
FIG. 1 is a diagram illustrating an example system.

FIG. 1 is a diagram illustrating an example system. System 100 may include one or more network devices, such as server 102. The system 100 may further include a plurality of switches. Each of the switches may be compatible with one or more protocols. Such protocols may include, for example, Ethernet and/or Fibre Channel. Thus, the plurality of switches need not be compatible with the same protocol. In this example, the switches include Ethernet switches 104 and 106, as well as Fibre Channel switches 108 and 110. The switches 104, 106, 108, and 110 each have corresponding ports, shown here as 104-a and 104-b, 106-a and 106-b, 108-a and 108-b, and 110-a and 110-b, respectively.

Two or more of the switches 104, 106, 108, and 110, may be connected to one another. In this example, the Ethernet switches 104 and 106 are connected, as shown, in order to support redundancy within the network. However, in a Fibre Channel network, the switches 108 and 110 are typically not connected. In addition, the switches 108 and 110 may be in the same or different "SAN fabrics."

Discovery Server 112 may be coupled to the one or more network devices, such as the server 102, via a network such as Internet 114. The Discovery Server 112 may automatically obtain (e.g., retrieve or receive) information from the network devices, such as the server 102. In addition, the Discovery Server 112 may also automatically obtain (e.g., retrieve or receive) information from the switches 104, 106, 108, and 110. From the information it has obtained, the Discovery Server 112 may automatically discover the connections between the ports of the network devices, such as the server 102, and the ports of the switches, 104, 106, 108, and 110.

Each of the network devices, shown here as server 102, may include one or more network interface cards (NICs), as well as one or more host bus adapters (HBAs). In this example, the server 102 includes two NICs, 116 and 118, and two HBAs, 120 and 122. Each of the NICs, 116 and 118, and HBAs, 120 and 122, may include a plurality of ports. In order to simplify the description, each of the NICs and HBAs is shown to have two ports, 116-a and 116-b, 118-a and 118-b, 120-a and 120-b, and 122-a and 122-b, respectively. The ports of a single NIC or HBA may be connected to different switches in order to support redundancy, as well as to increase the bandwidth. In this example, the two ports of each of the NICs 116 and 118 are connected to ports of the two different Ethernet switches, 104 and 106, as shown. Similarly, the two ports of each of the HBAs 120 and 122 are connected to ports of the two different Fibre Channel switches, 108 and 110.

In this example, a Discovery Agent 124 of the server 102 is responsible for collecting information that is relevant to its ports and their associated connections, as will be described in further detail below. In one embodiment, the Discovery Agent 124 is implemented in an operating system. The Discovery Agent 124 may include one or more software modules, which may be statically configured on one or more of the network devices, such as the server 102. Alternatively, in accordance with various embodiments, the Discovery Agent 124 may be dynamically loaded onto various network devices such as the server 102. The loading may be performed locally (e.g., via a cable) or remotely. For example, the Discovery Server 112 may be responsible for remotely loading the Discovery Agent 124 onto various network devices, such as the server 102. Thus, the disclosed embodiments may be performed with respect to any network device, since the network device need not be configured with any particular functionality prior to being shipped to customers.

In one embodiment, the Discovery Server 112 may boot the network device, server 102, in order to trigger the Discovery Agent to collect information to be provided to the Discovery Server. The Discovery Agent of the server 102 may then provide information such as a switch port identifier mapping for each of the plurality of ports of the server 102 to the Discovery Server 112. However, in accordance with one embodiment, the switch port identifier mapping does not also identify a specific switch associated with each switch port identifier. As a result, this information is not sufficient to physically identify a connection.

In order to obtain additional information associated with the switches and switch ports, the Discovery Server 112 may also obtain information directly from each of the switches 104, 106, 108, and 110. For example, the Discovery Server 112 may query each of the switches 104, 106, 108, and 110. The information sent by each switch to the Discovery Server 112 may include information such as the number of ports and/or MAC addresses/world-wide port names (WWPNs) associated with the switch. More specifically, the information sent by an Ethernet switch 104 or 106 may indicate the number of ports and the MAC address associated with each port, as well as a further identifier for each port such as a port number and/or card number. Similarly, the information sent by a Fibre channel switch 108 or 110 may indicate the number of ports and the WWPN associated with each port, as well as a further identifier for each port such as a port number and/or card number.

Once the Discovery Server 112 receives information from the Discovery Agent 124 and the switches, 104, 106, 108, and 110, the Discovery Server 112 may discover the corresponding connections. The information that identifies the connections may include information identifying a server port and corresponding switch port. In other words, this information may be used to physically identify the connections. A server port may be identified, for example, by a port number and NIC or HBA number. A switch port may be identified, for example, by a port number. For Fabric Channel switches, a switch port may be further identified by a SAN fabric identifier.

In this example, the Discovery Server 112 ascertains that Port1 of NIC 116 is connected to Port1 of Ethernet switch 104, Port2 of NIC 116 is connected to Port1 of Ethernet switch 106, Port1 of NIC 118 is connected to Port2 of Ethernet switch 104, Port2 of NIC 118 is connected to Port2 of Ethernet switch 106, Port 1 of HBA 120 is connected to Port1 of Fibre Channel switch 108, Port2 of HBA 120 is connected to Port1 of Fibre Channel switch 110, Port 1 of HBA 122 is connected to Port2 of Fibre Channel switch 108, and Port2 of HBA 122 is connected to Port2 of Fibre channel switch 110. The Discovery Server 112 may further ascertain that the Fibre Channel switch 108 is in SAN Fabric 1, while the Fibre channel switch 110 is in SAN Fabric 2.

The Discovery Server 112 may also perform "re-discovery" at a later time. The Discovery Server 112 may perform re-discovery may perform the same steps as performed during discovery. However, the Discovery Server 112 may not perform certain steps again. For instance, the Discovery Server 112 may not re-query the switches 104, 106, 108, 110 in order to obtain information that will not change over time.

In order to trigger a Discovery Agent of the server 102 to gather and send information to the Discovery Server 112, the Discovery Server 112 may reboot each of the network devices such as the server 102 via a corresponding lights out management (LOM) interface, shown at 126. For example, the Discovery Server 112 may maintain information identifying the LOM interface of each of the network devices. Using this information, the Discovery Server 112 may turn the server 102 off and then on via the corresponding LOM interface.

Figure 2:
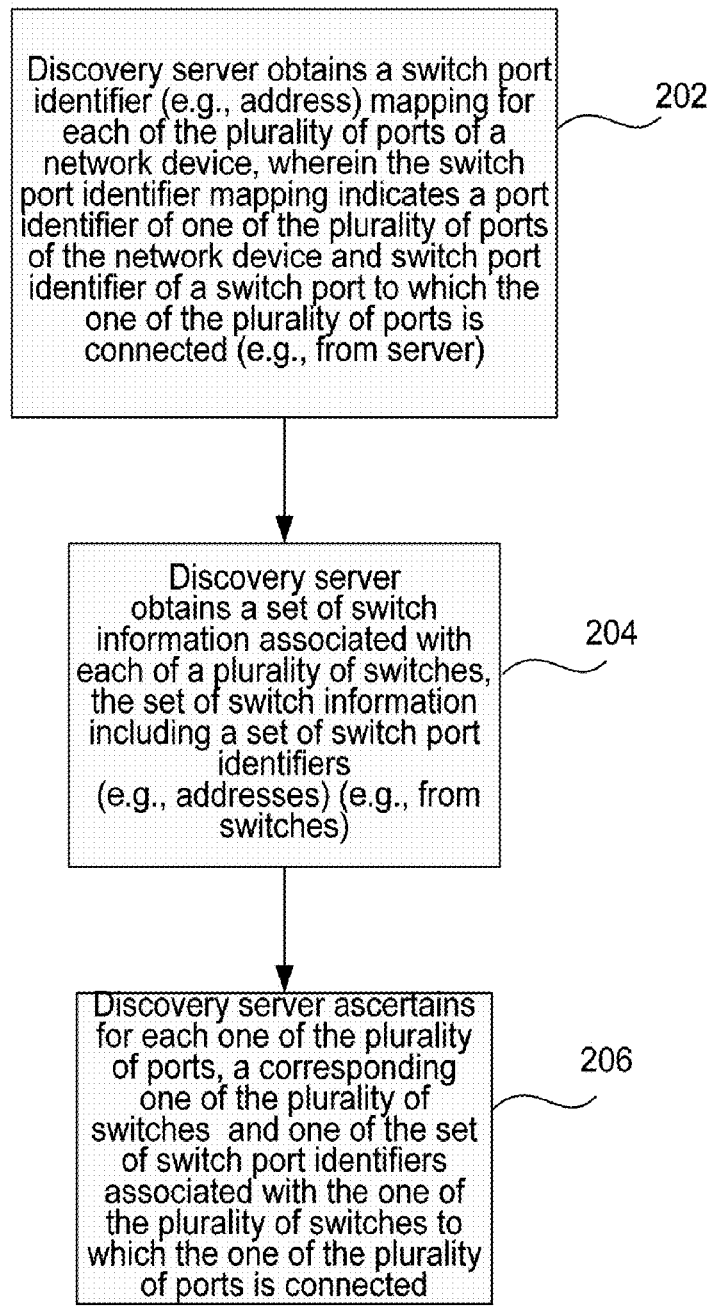
FIG. 2 is a process flow diagram illustrating an example method of performing discovery of network device to switch connectivity.

FIG. 2 is a process flow diagram illustrating an example method of performing discovery of network device to switch connectivity. An apparatus such as the Discovery Server may obtain a switch port identifier mapping for each of the plurality of ports of a network device, wherein the switch port identifier mapping indicates a port identifier of one of the plurality of ports of the network device and a switch port identifier of a switch port to which the one of the plurality of ports is connected at 202. However, as set forth above, in accordance with one embodiment, the switch port identifier mapping does not identify a port within the context of a specific switch. The apparatus may obtain a set of switch information for each of a plurality of switches, the set of switch information including a set of switch port identifiers associated with the corresponding one of the plurality of switches at 204. The apparatus may then ascertain for each one of the plurality of ports, a corresponding one of the plurality of switches and a port of the one of the plurality of switches to which the one of the plurality of ports is connected at 206.

Figure 3A:
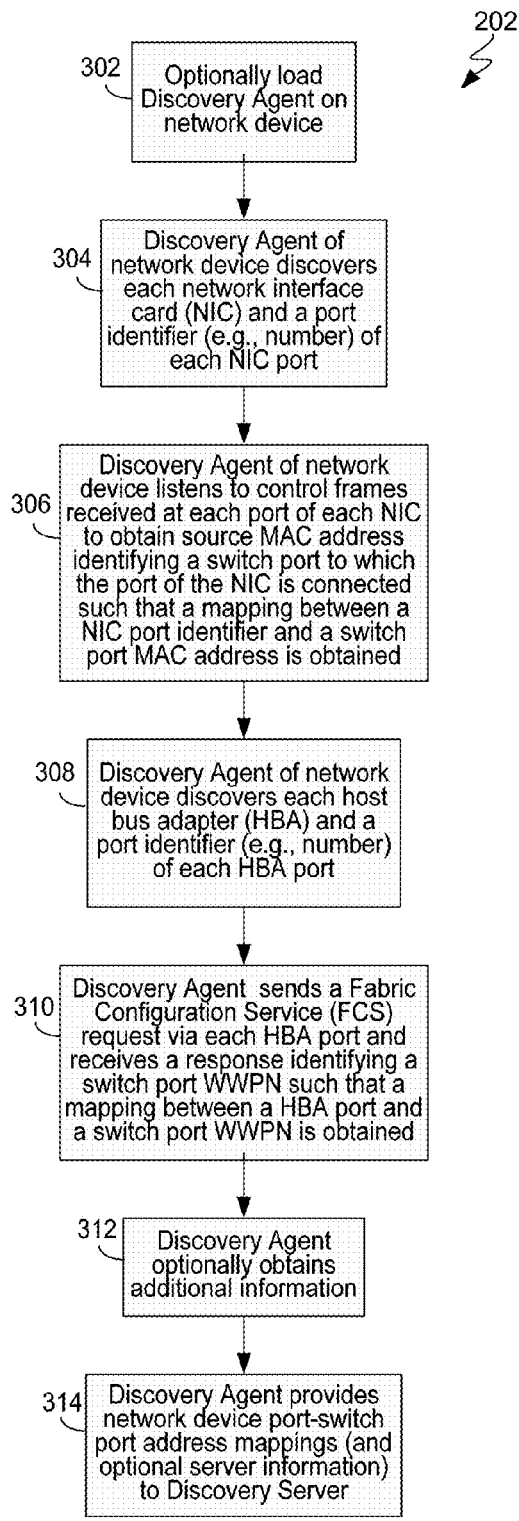
FIGS. 3A-3C are process flow diagrams that together illustrate an example method of performing discovery of network device to switch connectivity in accordance with one embodiment.
Figures 3B, 3C:
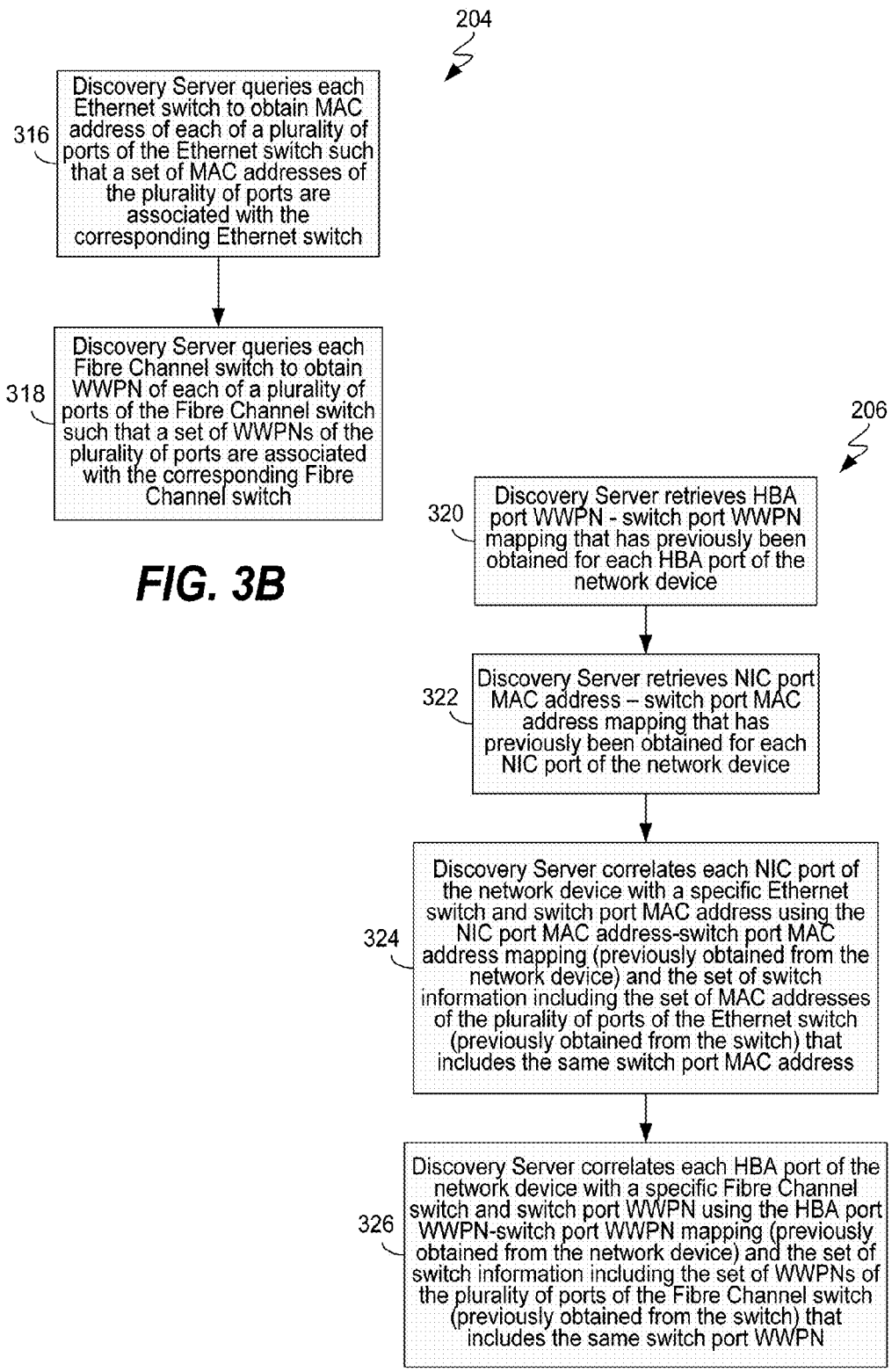

FIGS. 3A-3C together illustrate an example method of performing discovery of network device to switch connectivity as described with reference to FIG. 2 in accordance with one embodiment. FIG. 3A is a process flow diagram illustrating a method of obtaining a switch port identifier mapping for each of the plurality of ports of a network device, wherein the switch port identifier mapping indicates a port identifier of one of the plurality of ports of the network device and a switch port identifier of a switch port to which the one of the plurality of ports is connected, as described above with reference to block 202 of FIG. 2.

A Discovery Agent may be loaded on the network device at 302. For example, the Discovery Server may remotely provide a Discovery Agent to the network device, wherein the Discovery Agent is configured to generate a switch port identifier mapping for each of the plurality of ports of the network device.

The port identifier of the network device may simply identify a port (e.g., by number). In addition, the network device may include one or more line cards, which may also be identified by number. Thus, the port identifier may identify one of the line cards and a port number associated with the line card. As shown and described above with reference to FIG. 1, the network device may include one or more NICs and/or one or more HBAs. Thus, in this example, the port identifier of each of the plurality of ports of the network device may identify one of the NICs (e.g., by number) and a port of the NIC, or one of the HBAs (e.g., by number) and a port of the HBA. Of course, it is also possible that the port identifier of the network device may indicate an address such as a MAC address associated with a NIC port or a WWPN associated with a HBA port.

In order to generate a switch port identifier mapping for ports of each NIC, the Discovery Agent may discover each NIC of the network device (e.g., using a NIC identifier) and a port identifier (e.g., number) of each NIC port at 304. Specifically, the Discovery Agent of the network device may listen to control frames received by each port of each NIC to obtain a source MAC address identifying a switch port to which the port of the NIC is connected such that a mapping between a NIC port identifier and a switch port MAC address is obtained at 306. These control frames may include Ethernet control frames, which may be sent via a protocol such as Cisco Discovery Protocol (CDP), Link Aggregation Control Protocol (LACP), Bridge Protocol Data Units (BPDUs), or other control protocol frames generated by a connected switch.

Similarly, in order to generate a switch port identifier mapping for ports of each HBA, the Discovery Agent of the network device may discover each host bus adapter (HBA) (e.g., using a HBA identifier) and a port identifier (e.g., number) of each HBA port at 308. Specifically, the Discovery Agent may send a request such as a Fabric Configuration Management Service (FCMS) request via each HBA port and receive a response identifying a switch port WWPN such that a mapping between a HBA port and a switch port WWPN is obtained at 310.

The Discovery Agent may also obtain additional information associated with the network device at 312. For example, the Discovery Agent may discover information about the network device such as the central processing unit (CPU) type and speed, amount of memory, model number, and/or LOM information, etc.

The Discovery Agent may provide network device port-switch port address mappings (and optional server information) that it has obtained to the Discovery Server at 314. The Discovery Agent may provide these mappings via a file or other suitable mechanism. Upon receiving these mappings, the Discovery Server may store these mappings.

In accordance with one embodiment, network device port-switch port address mappings that the Discovery Server has received do not identify the specific switch that corresponds to a particular switch port address. Thus, the Discovery Server may seek to identify the switch that corresponds to each switch port address. FIG. 3B is a process flow diagram illustrating an example method of obtaining a set of switch information for each of a plurality of switches, where the set of switch information includes a set of switch port identifiers associated with the corresponding one of the plurality of switches, as described above with reference to block 204 of FIG. 2. The Discovery Server may query each Ethernet switch to obtain a set of switch information, the set of switch information for each Ethernet switch including a MAC address of each of a plurality of ports of the Ethernet switch such that a set of MAC addresses of the plurality of ports are associated with the corresponding Ethernet switch at 316. The Discovery Server may also query each Fibre Channel switch to obtain a set of switch information, the set of switch information for each Fibre Channel switch including a WWPN of each of a plurality of ports of the Fibre Channel switch such that a set of WWPNs of the plurality of ports are associated with the corresponding Fibre Channel switch at 318. The Discovery Server may store each set of switch information that has been obtained at steps 316 and 318.

Where the switch includes one or more line cards, the set of switch information may further identify a line card associated with a particular port. In addition, the switch information associated with a Fibre Channel switch may indicate a SAN fabric (physical or virtual) with which the switch or switch port is associated.

FIG. 3C is a process flow diagram illustrating an example method of ascertaining for each one of the plurality of ports of the network device, a corresponding one of the plurality of switches and a port of the one of the plurality of switches to which the one of the plurality of ports of the network device is connected, as described above with reference to 206 of FIG. 2. The Discovery Server may retrieve a HBA port WWPN—switch port WWPN mapping at 320 that has previously been obtained for each HBA port of the network device as described above with reference to FIG. 3A. Similarly, the Discovery Server may retrieve a NIC port MAC address—switch port MAC address mapping at 322 that has previously been obtained for each NIC port of the network device as described above with reference to FIG. 3A. In this manner, the Discovery Server may retrieve the switch port address that corresponds to each network device port from the information it has received as described above with reference to FIG. 3A.

The Discovery Server may then use the sets of switch information it has received as described above with reference to FIG. 3B in order to correlate the switch port address in each network device port—switch port address mapping to a specific switch. Specifically, the Discovery Server may correlate each NIC port of the network device with a specific Ethernet switch and switch port MAC address using the NIC port MAC address-switch port MAC address mapping (previously obtained from the network device) and the set of switch information including the set of MAC addresses of the plurality of ports of the Ethernet switch (previously obtained from the switch) that includes the same switch port MAC address as 324. Similarly, the Discovery Server may correlate each HBA port of the network device with a specific Fibre Channel switch and switch port WWPN using the HBA port WWPN-switch port WWPN mapping (previously obtained from the network device) and the set of switch information including the set of WWPNs of the plurality of ports of the Fibre Channel switch (previously obtained from the switch) that includes the same switch port WWPN at 326. In this manner, the Discovery Server may identify the one of the plurality of switches that is associated with the set of switch port identifiers that includes the switch port identifier of the switch port to which the one of the plurality of network device ports is connected.

From the set of switch information associated with the identified switch, the Discovery Server may "physically" identify the port (e.g., by port number). Where the switch includes one or more line cards, the Discovery Server may also identify a line card associated with the switch port. With respect to a Fibre Channel switch, the Discovery Server may also identify a SAN fabric associated with the switch or switch port.

Figure 4:
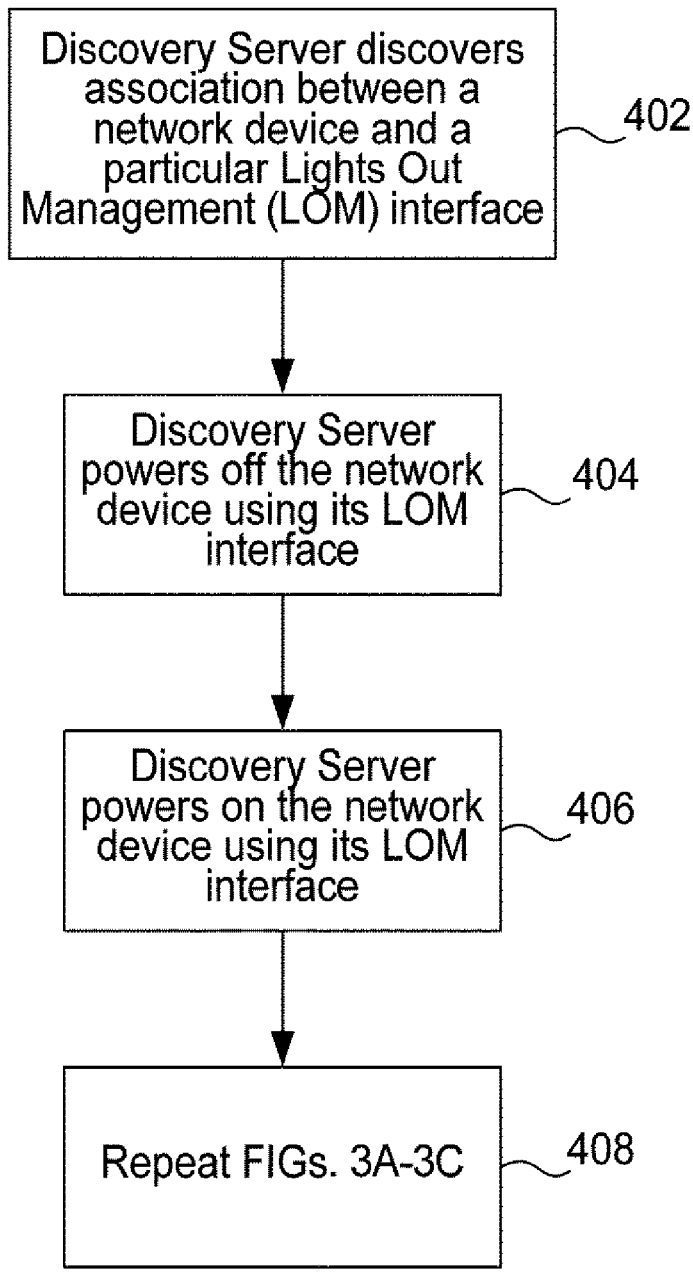
FIG. 4 is a process flow diagram illustrating an example method of performing re-discovery of network device to switch connectivity.

FIG. 4 is a process flow diagram illustrating an example method of performing re-discovery of network device to switch connectivity. The Discovery Server may discover an association between a network device and a particular Lights Out Management (LOM) interface at 402. The Discovery Server may power off the network device using its LOM interface at 404. The Discovery Server may then power on the network device using its LOM interface at 406. The Discovery Server may then repeat the steps described above with reference to FIGS. 3A-3C. Of course, since the Discovery Server has already received the sets of switch information from the switches, the Discovery Server may not repeat the steps described above with reference to FIG. 3B.

Other Embodiments

Generally, the disclosed techniques may be implemented on software and/or hardware. For example, they can be implemented in an operating system kernel, in a separate user process, in a library package bound into network applications, on a specially constructed machine, or on a network interface card. In a specific embodiment, the disclosed techniques are implemented in software such as an operating system or in an application running on an operating system.

A software or software/hardware hybrid implementation of the disclosed embodiments may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, various embodiments may be implemented in specially configured routers or servers available from Cisco Systems, Inc. of San Jose, Calif. A general architecture for some of these machines will appear from the description given below. In an alternative embodiment, the disclosed techniques may be implemented on a general-purpose network host machine such as a personal computer or workstation. Further, the disclosed embodiments may be at least partially implemented on a card (e.g., an interface card) for a network device or a general-purpose computing device.

Figure 5:
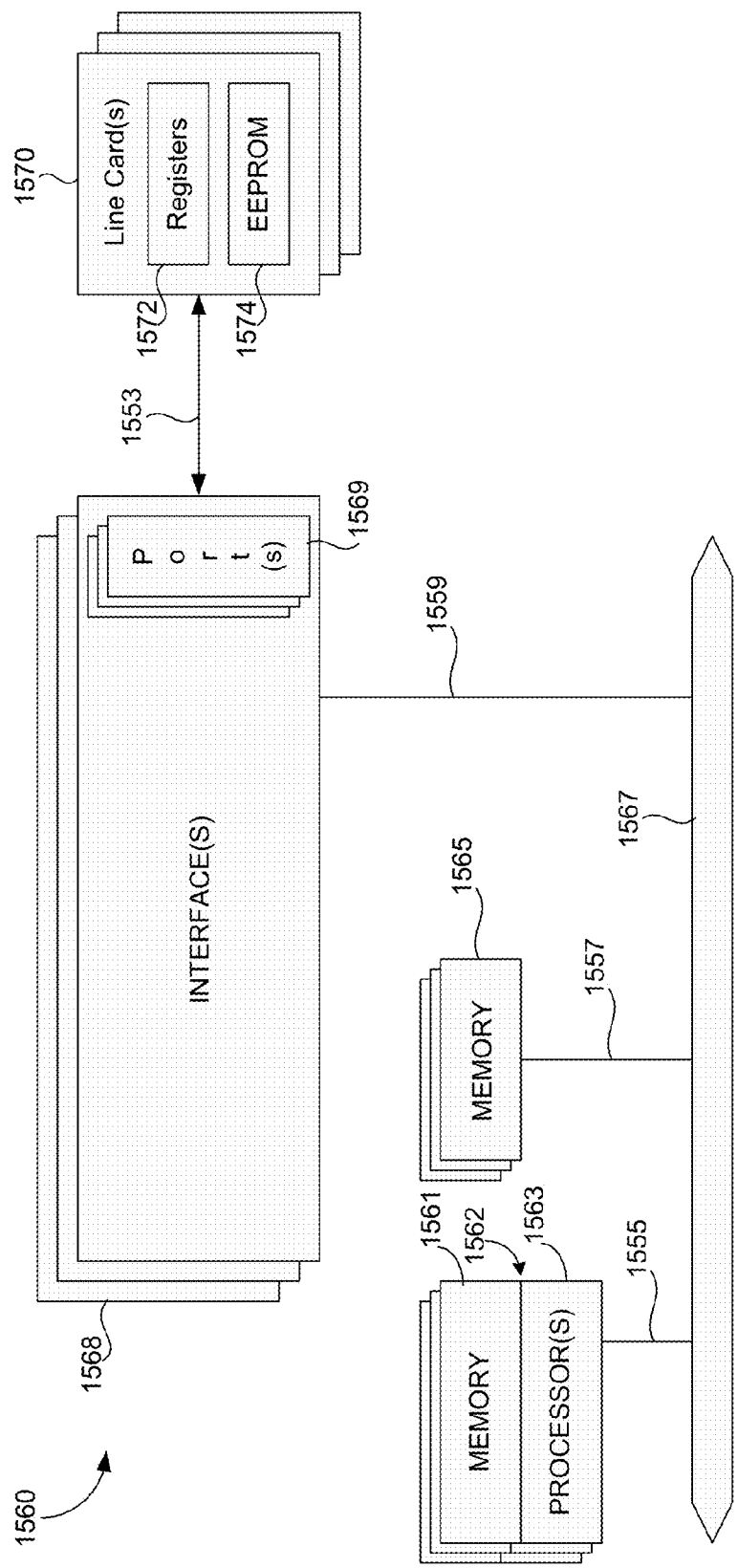
FIG. 5 is a diagrammatic representation of an example network device in which various embodiments may be implemented.

Referring now to FIG. 5, a network device 1560 suitable for implementing the disclosed embodiments includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. The CPU 1562 may accomplish these functions under the control of software including an operating system (e.g. Windows NT), and any appropriate application software.

CPU 1562 may include one or more processors 1563 such as a processor from the Motorola family of microprocessors or the MIPS family of microprocessors. In an alternative embodiment, processor 1563 may include specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 5 illustrates one specific network device, it is by no means the only network device architecture on which the disclosed embodiments can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM. Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
   obtaining a switch port identifier mapping for each of the plurality of ports of a network device, wherein the switch port identifier mapping indicates a port identifier of one of the plurality of ports of the network device and a switch port identifier of a switch port to which the one of the plurality of ports of the network device is connected;
   obtaining a set of switch information for each of a plurality of switches, the set of switch information including a set of switch port identifiers associated with the corresponding one of the plurality of switches, wherein the set of switch information for each of the plurality of switches does not include information pertaining to devices coupled to the corresponding one of the plurality of switches; and
   ascertaining for each one of the plurality of ports of the network device, using the set of switch information, a corresponding one of the plurality of switches and a port of the one of the plurality of switches to which the one of the plurality of ports of the network device is connected such that a port number identifying the port of the one of the plurality of switches to which the one of the plurality of ports of the network device is connected is identified, wherein the port number identifying the port of the one of the plurality of switches to which the one of the plurality of ports of the network device is connected is an identifier that is pertinent within the one of the plurality of switches.

2. The method as recited in claim 1, wherein ascertaining for each one of the plurality of ports of the network device, using the set of switch information, a corresponding one of the plurality of switches and a port of the one of the plurality of switches to which the one of the plurality of ports of the network device is connected comprises:

obtaining the switch port identifier mapping associated with the one of the plurality of ports of the network device, wherein the switch port identifier mapping indicates the port identifier of the one of the plurality of ports of the network device and the switch port identifier of the switch port to which the one of the plurality of ports is connected; and identifying the one of the plurality of switches that is associated with the set of switch port identifiers that includes the switch port identifier of the switch port to which the one of the plurality of ports of the network device is connected.

3. The method as recited in claim 2, further comprising:

obtaining the set of switch information associated with the identified one of the plurality of switches, wherein the set of switch information associated with the identified one of the plurality of switches includes a set of port numbers mapped to the set of switch port identifiers; and ascertaining the port number associated with the switch port identifier of the switch port to which the one of the plurality of ports of the network device is connected from the set of switch information such that the port of the one of the plurality of switches to which the one of the plurality of ports of the network device is connected is identified by the port number.

4. The method as recited in claim 1, wherein obtaining the switch port identifier mapping for each of the plurality of ports of the network device comprises:

receiving the switch port identifier mapping for each of the plurality of ports of the network device from the network device.

5. The method as recited in claim 4, further comprising:

booting the network device prior to receiving the switch port identifier mapping for each of the plurality of ports of the network device from the network device.

6. The method as recited in claim 4, further comprising:

providing a discovery agent to the network device, wherein the discovery agent is configured to generate the switch port identifier mapping for each of the plurality of ports of the network device.

7. The method as recited in claim 1, wherein obtaining the set of switch information associated with each of a plurality of switches, the set of switch information including the set of switch port identifiers, comprises:

receiving the set of switch port identifiers associated with each of a plurality of switches from the plurality of switches.

8. The method as recited in claim 1, wherein the switch port identifier is a MAC address and the set of switch port identifiers includes one or more MAC addresses.

9. The method as recited in claim 8, wherein the switch port is a port of an Ethernet switch.

10. The method as recited in claim 1, wherein the switch port identifier is a world-wide port name ("WWPN"), the switch port is a port of a Fibre Channel switch and the set of switch port identifiers includes one or more WWPNs.

11. The method as recited in claim 1, wherein the network device includes one or more line cards, wherein the port identifier of each of the plurality of ports of the network device identifies one of the line cards and a port number associated with the line card.

12. The method as recited in claim 11, wherein the one or more line cards comprise at least one of one or more network interface cards or one or more host bus adapters, wherein the port identifier of each of the plurality of ports of the network device identifies one of the network interface cards or one of the host bus adapters.

13. The method as recited in claim 1, further comprising:

ascertaining a storage area network fabric with which the one of the plurality of switches is associated.

14. The method as recited in claim 1, wherein the switch port identifier does not identify a particular switch.

15. The method as recited in claim 1, wherein obtaining the set of switch information associated with each of a plurality of switches, the set of switch information including the set of switch port identifiers, comprises receiving the set of switch port identifiers associated with each of a plurality of switches from the plurality of switches; and wherein obtaining the switch port identifier mapping for each of the plurality of ports of the network device comprises receiving the switch port identifier mapping for each of the plurality of ports of the network device from the network device.

16. An apparatus, comprising:

means for obtaining a switch port identifier mapping for each of the plurality of ports of a network device, wherein the switch port identifier mapping indicates a port identifier of one of the plurality of ports of the network device and a switch port identifier of a switch port to which the one of the plurality of ports of the network device is connected;

means for obtaining a set of switch information for each of a plurality of switches, the set of switch information including a set of switch port identifiers associated with the corresponding one of the plurality of switches, wherein the set of switch information for each of the plurality of switches does not include information pertaining to devices coupled to the corresponding one of the plurality of switches; and means for ascertaining for each one of the plurality of ports of the network device, using the set of switch information, a corresponding one of the plurality of switches and a port of the one of the plurality of switches to which the one of the plurality of ports of the network device is connected such that a port number within the one of the plurality of switches is identified, wherein the identified port number is local to the one of the plurality of switches to which the one of the plurality of ports of the network device is connected.

17. An apparatus, comprising:

a processor; and a memory, at least one of the processor or the memory being configured for:

obtaining a switch port identifier mapping for each of the plurality of ports of a network device, wherein the switch port identifier mapping indicates a port identifier of one of the plurality of ports of the network device and a switch port identifier of a switch port to which the one of the plurality of ports of the network device is connected;

obtaining a set of switch information for each of a plurality of switches, the set of switch information including a set of switch port identifiers associated with the corresponding one of the plurality of switches, wherein the set of switch information for each of the plurality of switches does not include information pertaining to devices coupled to the corresponding one of the plurality of switches; and ascertaining for each one of the plurality of ports of the network device, using the set of switch information, a corresponding one of the plurality of switches and a port of the one of the plurality of switches to which the one of the plurality of ports of the network device is connected such that a port number within the one of the plurality of switches is identified, wherein the identified port number is local to the one of the plurality of switches to which the one of the plurality of ports is connected.

18. The apparatus as recited in claim 17, wherein ascertaining for each one of the plurality of ports, a corresponding one of the plurality of switches and a port of the one of the plurality of switches to which the one of the plurality of ports is connected comprises:

obtaining the switch port identifier mapping associated with one of the plurality of ports of the network device, wherein the switch port identifier mapping indicates the port identifier of the one of the plurality of ports of the network device and the switch port identifier of the switch port to which the one of the plurality of ports is connected; and identifying the one of the plurality of switches that is associated with the set of switch port identifiers that includes the switch port identifier of the switch port to which the one of the plurality of ports of the network device is connected.

19. The apparatus as recited in claim 18, at least one of the processor or the memory being further configured for:

obtaining the set of switch information associated with the identified one of the plurality of switches, wherein the set of switch information associated with the identified one of the plurality of switches includes a set of port numbers corresponding to the set of switch port identifiers; and ascertaining a port number associated with the switch port identifier of the switch port to which the one of the plurality of ports of the network device is connected from the set of switch information such that the port of the one of the plurality of switches to which the one of the plurality of ports of the network device is connected is identified by the port number.

20. The apparatus as recited in claim 17, wherein obtaining the switch port identifier mapping for each of the plurality of ports of the network device comprises:

receiving the switch port identifier mapping for each of the plurality of ports of the network device from the network device.

21. The apparatus as recited in claim 20, at least one of the processor or the memory being further configured for:

booting the network device prior to receiving the switch port identifier mapping for each of the plurality of ports of the network device from the network device.

22. The apparatus as recited in claim 20, at least one of the processor or the memory being further configured for:

providing a discovery agent to the network device, wherein the discovery agent is configured to generate the switch port identifier mapping for each of the plurality of ports of the network device.

23. The apparatus as recited in claim 17, wherein obtaining the set of switch information associated with each of a plurality of switches, the set of switch information including the set of switch port identifiers, comprises:

receiving the set of switch port identifiers associated with each of a plurality of switches from the plurality of switches.

24. The apparatus as recited in claim 17, wherein ascertaining for each one of the plurality of ports of the network device, using the set of switch information, a corresponding one of the plurality of switches and the port of the one of the plurality of switches to which the one of the plurality of ports is connected further comprises:

identifying a line card that includes the port of the one of the plurality of switches to which the one of the plurality of ports of the network device is connected.

* * * * *